United States Patent [19]

Kamiya et al.

[11] 3,960,441

[45] June 1, 1976

[54] ANTI-REFLECTION COATING HAVING PSEUDO-INHOMOGENEOUS LAYERS

[75] Inventors: Osamu Kamiya, Yokohama; Susumu Itoh, Tokyo, both of Japan

[73] Assignee: Canon Kabushiki Kaisha, Tokyo, Japan

[22] Filed: June 5, 1975

[21] Appl. No.: 583,969

Related U.S. Application Data

[63] Continuation of Ser. No. 402,909, Oct. 3, 1973, abandoned.

[30] Foreign Application Priority Data

Oct. 6, 1972 Japan.............................. 47-100388

[52] U.S. Cl. ............................................. 350/164
[51] Int. Cl.².......................................... G02B 5/28
[58] Field of Search....................... 350/1, 163–166

[56] References Cited
UNITED STATES PATENTS

3,235,397  2/1966  Millendorfer...................... 350/164
3,737,210  6/1973  Howe.................................. 350/166
3,761,160  9/1973  Apfel et al. ........................ 350/164

*Primary Examiner*—Ronald J. Stern
*Attorney, Agent, or Firm*—Toren, McGeady and Stanger

[57] ABSTRACT

A coating for reducing unwanted reflection off a surface of a substrate. The coating is made up of an inner layer, and outer layer subsequently deposited in that order from the substrate, at least one of these layers being an inhomogeneous layer having a moderate distribution of refractive index in the direction of thickness. Desired different gradients of the refractive index distribution are effected by the superposition of sublayers of materials having a high index of refraction and a low index of refraction deposited by vacuum evaporation one upon the other and having different combinations of thicknesses thereof.

4 Claims, 6 Drawing Figures

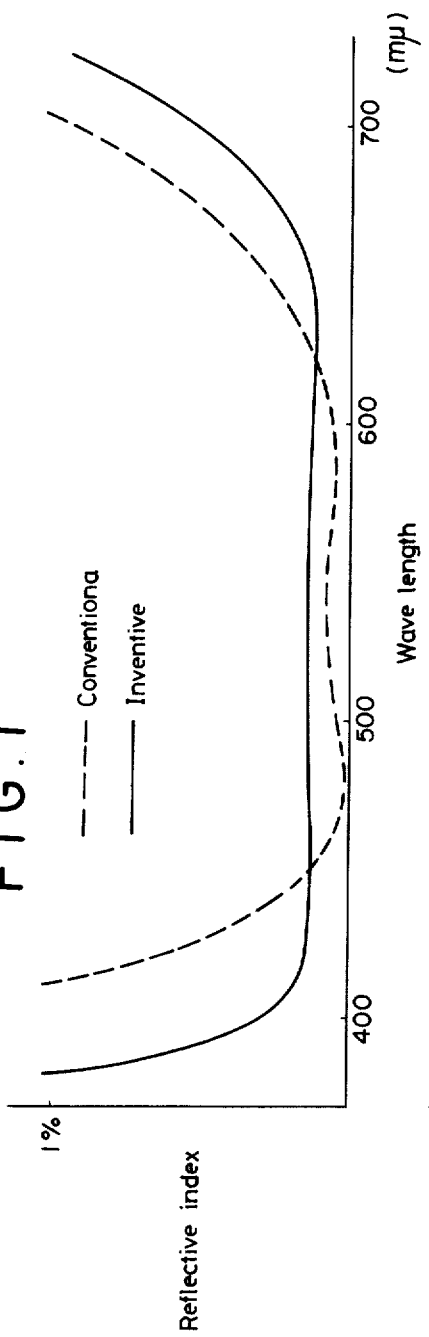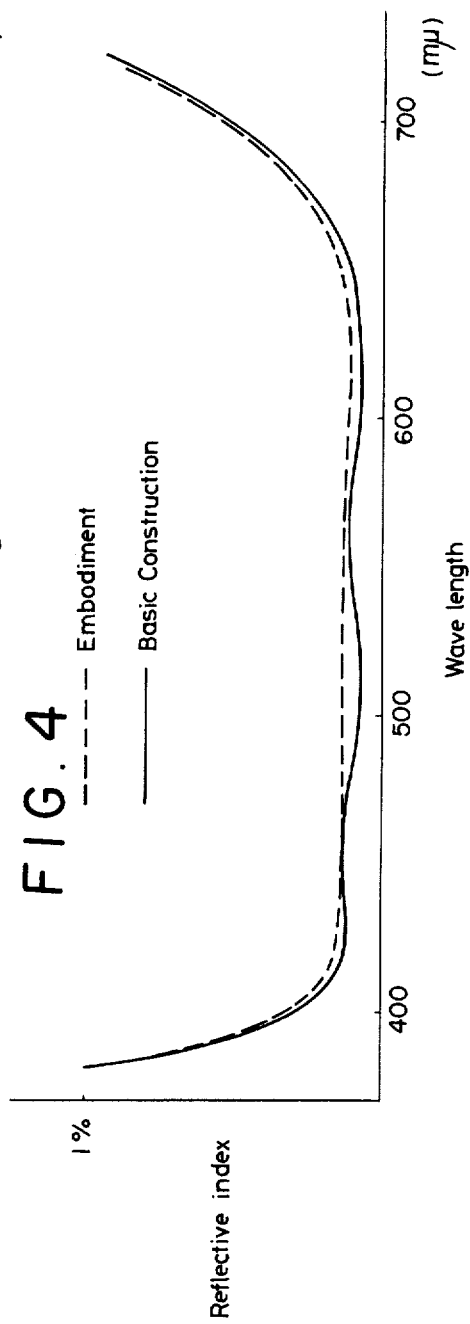

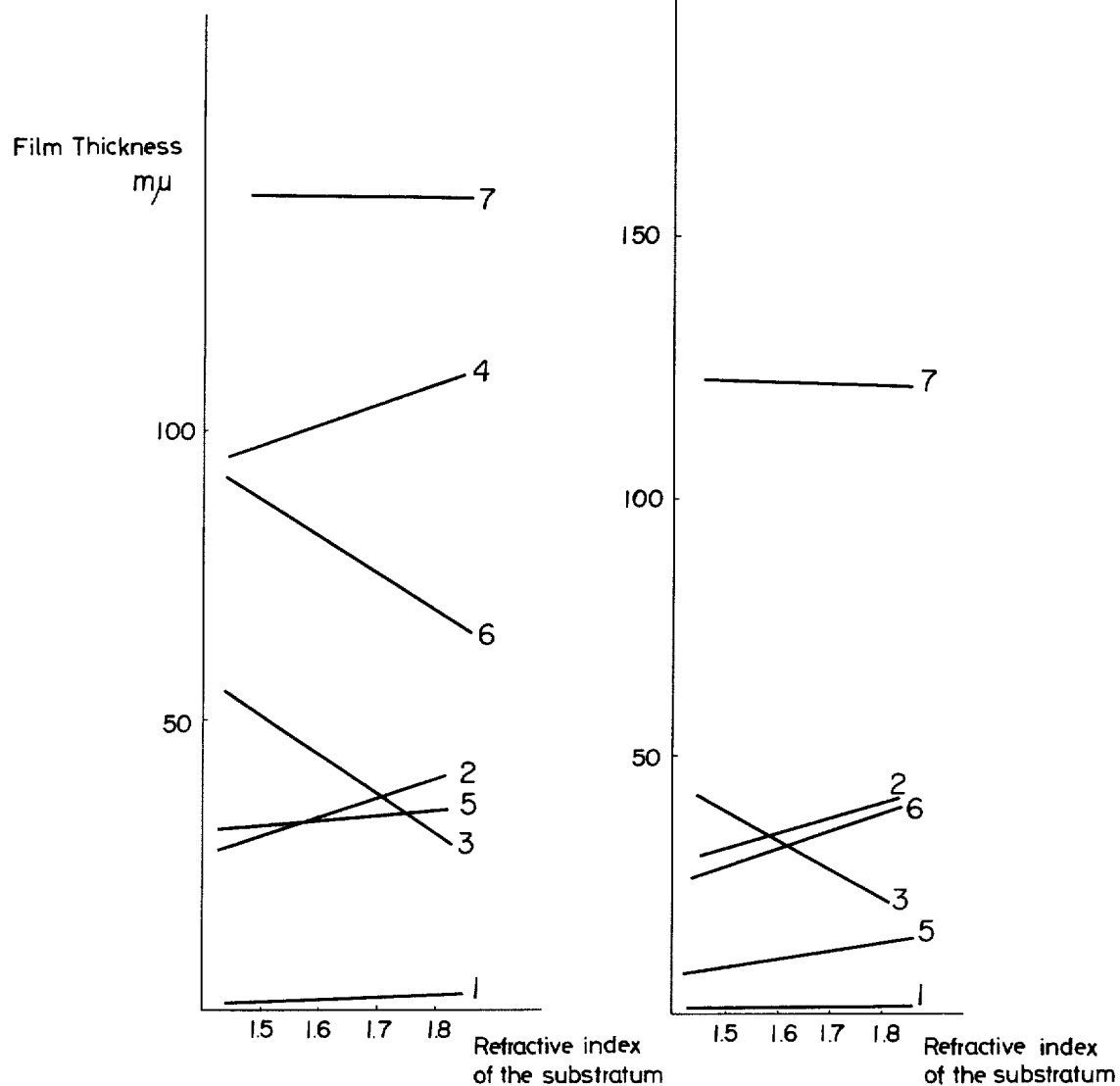

ANTI-REFLECTION COATING HAVING PSEUDO-INHOMOGENEOUS LAYERS

This is a continuation of application Ser. No. 402,909 which was filed Oct. 3, 1973, now abandoned.

BACKGROUND OF THE INVENTION

This invention relates to antireflection coatings. More particularly this invention relates to a multilayer antireflection coating for use on transparent substrates, the coating having at least one pseudoinhomogeneous layer of which the index of refraction is disproportionally distributed in the direction of thickness.

Various types of antireflection coatings are now well known and are used on the surfaces of lenses, prisms and other transparent elements constituting part of optical instruments to reduce unwanted light reflection off the surfaces thereof and in turn to increase the transmittance.

One type of antireflection coatings is such that three layers of different materials having a high index of refraction and a low index of refraction are deposited on a transparent substrate one upon the other by any of the well-known techniques such as evaporation in a high vacuum. The antireflection coating has a design wavelength λ in a spectral region wherein the reflectance does not exceed a certain specified value, and consists of a first layer having an optical thickness of one quarter of the design wavelength, a second layer having an optical thickness of one-half wavelength and a third layer having an optical wavelength of one quarter wavelength in the order in which they are deposited on the substrate. Each of the layers is a homogeneous layer of which the index of refraction is uniformly distributed throughout the layer.

In order for a three-layer antireflection coating of the type described as the basic form of coating design to reduce the surface reflectance to a lower value over a wider spectral region with maintenance of proper color balance that was previously possible with the three homogeneous layers, a solution has been proposed for the second layer. According to this proposal, the second homogeneous layer is replaced by an inhomogeneous layer of materials having a gently sloped distribution of the index of refraction in the direction of thickness, thereby to provide an improved performance three-layer antireflection coating. However, several difficulties are sometimes encountered in forming such an inhomogeneous layer, owing to the limitation of available materials for the layer, close relationship of the indices of refraction of the three layers relative to that of the substrate, and the requirement of much time and labor for carrying out the vacuum evaporation.

SUMMARY OF THE INVENTION

The present invention provides a novel antireflection coating made up of a high index material and a low index material in layers superposed one upon the other, characterized in that at least one layer of the superposed layers is constructed by superposing sublayers of a high index material and sublayers of a low index material one upon the other so that the indices of refraction are distributed as changing continuously in effect in the direction of thickness. The resultant thickness of the superposed sublayers is almost equal to the thickness of the inhomogeneous layer to be replaced, and the gradient of the refractive index distribution can be controlled by varying the thicknesses of the sublayers relative to one another.

The feature of the inhomogeneous layer approximation of the basic construction is that the pseudoinhomogeneous layer is an asymmetric triple sublayer film of which the three superposed sublayers are made of at least two different index materials and of which the both sublayers sandwiching the central sublayer have different thicknesses from each other.

It is accordingly a first object of the present invention to provide an improved performance antireflection coating having inhomogeneous layers over the antireflection coating of which all the layer are homogeneous.

A second object of the present invention is to provide an antireflection coating which is marked in an increased possibility of designing the antireflection coating because the pseudoinhomogenous layer can be formed by using two coating materials at least.

A third object of the present invention is to provide an antireflection coating of a wide range of materials.

A fourth object of the present invention is to provide an antireflection coating which reduces the surface reflectance to a lower value over an extended spectral range so as to be most efficient as indicated at solid line curve in FIG. 1 as compared with a typical known three-layer antireflection coating of which the reflectance is illustrated by the dash line curve.

A fifth object of the present invention is to provide an antireflection coating for use on an extended range of index of refraction of the transparent substrate.

BRIEF EXPLANATION OF THE DRAWINGS

FIG. 1 is a graph showing the reflectance of a typical antireflection coating constructed according to this invention in comparison with the reflectance of a known antireflection coating.

FIG. 4 is a graph showing the reflectance of the seven-layer antireflection coating of the present invention in comparison with the reflectance of a three-layer antireflection coating of the basic construction for the above embodiment.

FIGS. 5 and 6 are graphs illustrating the variations of thickness of the seven layers of the antireflection coating of A and B types respectively with the variation of the index of refraction for the substratum.

PREFERRED EMBODIMENTS OF THE PRESENT INVENTION

The present invention is based on the fact that as far as the basic construction is concerned, one inhomogeneous layer can be approximated by a three-sublayer film, provided that the thicknesses of the both sublayers sandwiching the intermediate sublayer are unbalanced.

Figure 2:
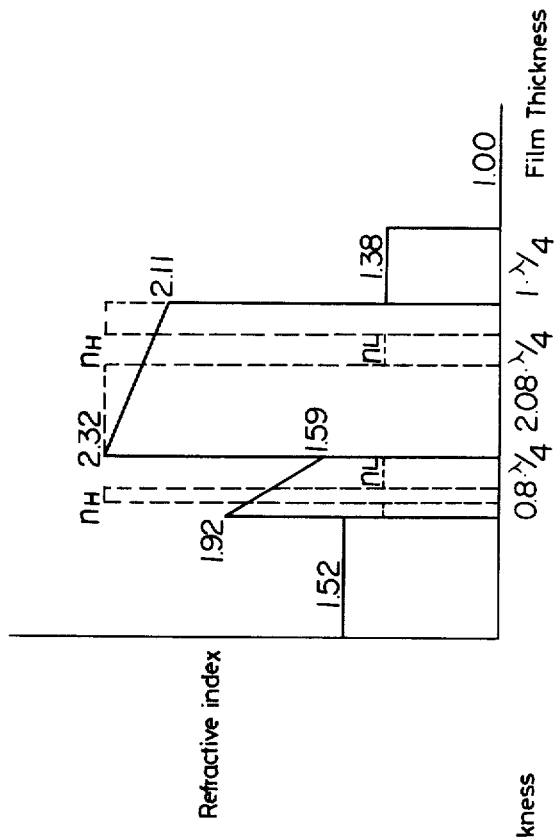
FIG. 2 is a graph showing the refractive index distribution of an inhomogenous layer and its equivalent refractive index distribution of a pseudoinhomogenous triple sublayer film constructed according to the present invention.

According to one embodiment of the present invention, as shown in FIG. 2, a single inhomogeneous film of which the index of refraction is continuously distributed as gradually decreasing with increase in the distance from the substrate to the air as indicated by solid lines may be replaced by an unbalanced three-sublayer film of which the sublayer adjacent to the substrate has a larger thickness than the sublayer exposed to the air as indicated by dash lines. Likewise, a more than three-sublayer film approximation can be utilized instead of the single inhomogeneous layer, provided that the more than three sublayers of a high index material and a low index material superposed one upon the other have different thicknesses from one another. In the drawings, $n_G$ denotes the index of refraction of the substrate glass, $n_0$ the index of refraction of air, $n_H$ a high index of refraction of a coating material, and $n_L$ a low index of refraction of a coating material. Further as shown in FIG. 3, the feature of the invention is also applicable to a high performance three-layer antireflection coating including two inhomogeneous layers, and it will be appreciated that each of these inhomogeneous layers can be approximated by the three-sublayer film of the invention.

Figure 3:
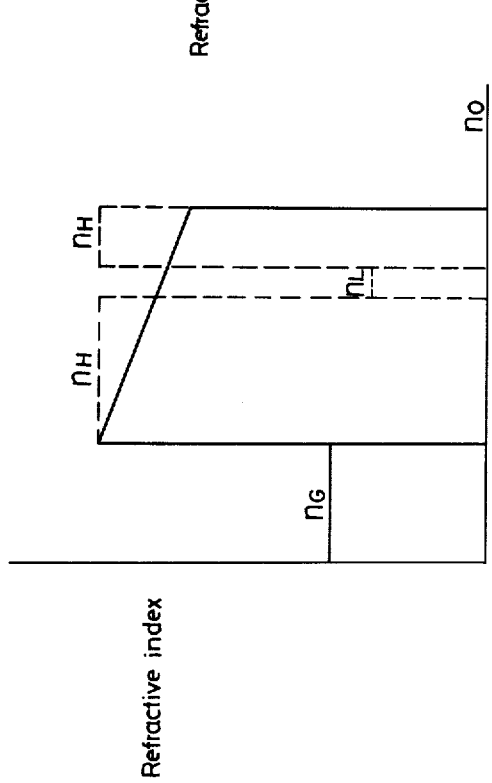
FIG. 3 is a graph showing the refractive index distribution of a seven-layer antireflection coating embodying the present invention in comparison with a modification of a known antireflection coating including two inhomogeneous layers.

According to the above-mentioned second embodiment as illustrated by the dash lines in FIG. 3, the first layer of the triple layer antireflection coating is made up of an asymmetric triple sublayer film of which the intermediate sublayer having a high index of refraction is sandwiched between the two outer sublayers having a low index of refraction, and the second layer is made up of an asymmetric triple layer film of which the intermediate sublayer having the low index of refraction is sandwiched between the two outer sublayers having the high index of refraction. In the antireflection coating of the basic construction, the uppermost third layer having a low index of refraction and having an optical thickness of one quarter of the design wavelength is used without modification as the uppermost layer of the embodiment of the invention. In FIG. 4, there are shown the reflectance of the coating of the basic construction by the solid line curve and the reflectance of the embodiment by the dash line curve. The ordinate is in percent reflectance and the abcissa is in wavelength in millimicrons. In the embodiment, any of the materials having an index of refraction ranging from 1.80 to 2.60 is usable as the high index material for some of the sublayers with a slight modification of the thickness, whereas any of the materials having an index of refraction ranging from 1.35 to 1.80 is usable as the low index material for the other sublayers and the layers other than the uppermost layer ($\lambda/4$) with a modification of thicknesses. As the uppermost layer material use can be made of any of the materials having an index of refraction ranging from 1.35 to 1.50. However, it should be noted that in order to reduce the reflectance of the coating as small as possible, a larger difference of the index of refraction between the higher index material and the low index material is preferred.

When the materials having indices of refraction within the above specified ranges are used for deposition on a substrate, the modification of thickness of each sublayer depends upon the index of refraction of the used material for the sublayer. But for one substrate having a low index of refraction, the modification of the standard thickness of each sublayer or layer except certain sublayers may be sufficiently within the range of $\pm 0.15 \times \lambda/4$.

On the other hand, the combinations of the standard thicknesses for the sublayers and layers may be classified into two main groups herein temporarily called 'A type' and 'B type'. The ranges of modification of the standard thicknesses dependent upon the ranges of the applicable indices of refraction of the used materials for the corresponding sublayers and layers are tabulated in Table 1, wherein the substrate has an index of refraction of 1.52, and the thickness is an optical thickness reduced by using one quarter of the design wavelength $\lambda$ as a unit.

Table 1

| Substrate | A type Thickness | A type Control width | B type Thickness | B type Control width |
|---|---|---|---|---|
| first layer | 0.04 | ± 0.04 | 0.04 | ± 0.04 |
| second layer | 0.23 | ± 0.15 | 0.27 | ± 0.15 |
| third layer | 0.37 | ± 0.15 | 0.35 | ± 0.15 |
| fourth layer | 0.69 | ± 0.15 | 2.00 | ± 0.15 |
| fifth layer | 0.22 | ± 0.15 | 0.08 | ± 0.08 |
| sixth layer | 0.59 | ± 0.15 | 0.25 | ± 0.15 |
| seventh layer Air | 1.00 | | 1.00 | |

As is clear from Table 1, the thickness of the first layer is very thin. When it is sufficiently thin, the first layer may be omitted. In this case, the antireflection coating consists of six layers, the layer adjacent to the substrate being made of a high index material.

FIGS. 5 and 6 illustrate the dependence of the standard thickness upon the index of refraction of the substrate. The numeral characters indicate the layers counting from the substrate. It is understood that, in the case of A type, as the index of refraction $n$ of the substrate increases, the required thickness of the 2nd., 4th and 5th layers will increase and the required thickness of the 3rd. and 6th layers will decrease, while, in the case of B type, the required thickness of the 2nd., 5th and 6th. layers will increase and the required thickness the 3rd. layer will decrease.

The following is a table of the particular values of the index of refraction and thickness of each layer for six different combinations. In the table, Ng stands for the index of refraction of the glass substrate, Nh the index of refraction of the high index layer, Nl the index of refraction of the low index layer other than the uppermost layer, $Nl_0$ the index of refraction of the uppermost layer, and $N_0$ the index of refraction of air. The thicknesses of the layers are in millimicrons.

Table 2

| | Ng | 1 Nl | 2 Nh | 3 Nl | 4 Nh | 5 Nl | 6 Nh | 7 Nl₀ | N₀ |
|---|---|---|---|---|---|---|---|---|---|
| Index of refraction | 1.52 | 1.38 | 2.20 | 1.38 | 2.20 | 1.38 | 2.20 | 1.38 | 1.00 |
| Thickness A₁ | | 0 | 32 | 50 | 98 | 32 | 82 | 140 | — |
| Thickness B₁ | | 5 | 34 | 38 | 240 | 9 | 29 | 120 | |
| Index of refraction | 1.52 | 1.45 | 2.20 | 1.45 | 2.20 | 1.45 | 2.20 | 1.38 | 1.00 |
| Thickness A₂ | | 0 | 31 | 55 | 99 | 32 | 83 | 139 | — |
| Thickness B₂ | | 2 | 33 | 45 | 237 | 8 | 32 | 123 | — |

Table 2-continued

|  | Ng | 1 Nl | 2 Nh | 3 Nl | 4 Nh | 5 Nl | 6 Nh | 7 Nl₀ | N₀ |
|---|---|---|---|---|---|---|---|---|---|
| Index of refraction | 1.70 | 1.38 | 2.20 | 1.38 | 2.20 | 1.38 | 2.20 | 1.38 | 1.00 |
| Thickness A₃ |  |  | 35 | 37 | 100 | 34 | 74 | 143 | — |
| Thickness B₃ | — | 0 | 39 | 27 | 243 | 13 | 38 | 122 | — |

What is claimed is:

1. An anti-refraction coating for use in reducing light reflection off the surface of a transparent substrate, said coating comprising seven sub-layers which are superposed on each other by vacuum evaporation, said sub-layers being designated from 1 to 7 in consecutive numerical order from the substrate, respectively; the odd-numbered sub-layers 1, 3, 5 and 7 being composed of a material having a low refractive index, the even-numbered sub-layers 2, 4, and 6 being composed of a material having a high refractive index, each sub-layer having an associated optical thickness value as follows:

| first sub-layer | = | $(0.04 \pm 0.004) \lambda/4$ |
|---|---|---|
| second sub-layer | = | $(0.23 \pm 0.15) \lambda/4$ |
| third sub-layer | = | $(0.37 \pm 0.15) \lambda/4$ |
| fourth sub-layer | = | $(0.69 \pm 0.15) \lambda/4$ |
| fifth sub-layer | = | $(0.22 \pm 0.15) \lambda/4$ |
| sixth sub-layer | = | $(0.59 \pm 0.15) \lambda/4$ | and the seventh sub-layer = $\lambda/4$, whereby said first, second and third sub-layer behave as a single inhomogeneous layer and said fourth, fifth and sixth layers behave as a single inhomogeneous layer.

2. The anti-reflection coating of claim 1 wherein the refractive indices of material forming the first, third and fifth sub-layers are within the range of 1.35 to 1.50 and wherein the refractive indices of material forming the second, fourth and sixth sub-layers are within the range of 1.80 to 2.60 and wherein the refractive index of material forming the seventh sub-layer is within the range of 1.35 to 1.50.

3. An anti-reflection coating for use in reducing light reflection off the surface of a transparent substrate, said coating comprising seven sub-layers which are superposed on each other by vacuum evaporation, said sub-layers being designated from 1 to 7 in consecutive numerical order from the substrate respectively, the off-numbered sub-layers being composed of a material having a low refractive index, the even-numbered sub-layers being composed of a material having a high refractive index, each sub-layer having an optical thickness as follows:

| first sub-layer | = | $(0.04 \pm 0.04) \lambda/4$ |
|---|---|---|
| second sub-layer | = | $(0.27 \pm 0.15) \lambda/4$ |
| third sub-layer | = | $(0.37 \pm 0.15) \lambda/4$ |
| fourth sub-layer | = | $(2.00 \pm 0.15) \lambda/4$ |
| fifth sub-layer | = | $(0.08 \pm 0.15) \lambda/4$ |
| sixth sub-layer | = | $(0.25 \pm 0.15) \lambda/4$ |
| seventh sub-layer | = | $\lambda/4$, | whereby said first, second and third sub-layers behave as a single inhomogeneous layer and said third, fourth and fifth sub-layers behave as a single inhomogeneous layer.

4. The anti-reflection coating of claim 3 wherein the refractive indices of material forming the first, third and fifth sub-layers are within the range of 1.35 to 1.50 and wherein the refractive indices of material forming the second, fourth and sixth sub-layers are within the range of 1.80 to 2.60 and wherein the refractive index of material forming the seventh sub-layer is within the range of 1.35 to 1.50.

* * * * *